US012809366B2

(12) United States Patent
Terakado et al.

(10) Patent No.: US 12,809,366 B2
(45) Date of Patent: Nov. 24, 2026

(54) ABNORMALITY DETECTION SYSTEM AND METHOD USING MACHINE LEARNING BASED ON CORRELATION OR DECORRELATION DATA

(71) Applicant: KABUSHIKI KAISHA TOSHIBA, Kawasaki (JP)

(72) Inventors: Yusuke Terakado, Yokohama Kanagawa (JP); Shinya Tominaga, Yokohama Kanagawa (JP); Naoyuki Takado, Tokyo (JP); Ryota Miyake, Yokohama Kanagawa (JP); Toshio Aoki, Chigasaki Kanagawa (JP); Chikashi Miyamoto, Yokohama Kanagawa (JP); Kouta Nakata, Tokyo (JP); Susumu Naito, Yokohama Kanagawa (JP); Yasunori Taguchi, Kawasaki Kanagawa (JP); Yuichi Kato, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 472 days.

(21) Appl. No.: 18/313,569

(22) Filed: May 8, 2023

(65) Prior Publication Data

US 2023/0367307 A1 Nov. 16, 2023

(30) Foreign Application Priority Data

May 13, 2022 (JP) ................................. 2022-079540

(51) Int. Cl.
*G05B 23/02* (2006.01)

(52) U.S. Cl.
CPC ................................ *G05B 23/0283* (2013.01)

(58) Field of Classification Search
None
See application file for complete search history.

(56) References Cited

U.S. PATENT DOCUMENTS

2014/0279795 A1 9/2014 Shibuya et al.
2016/0321594 A1 11/2016 Linde et al.
(Continued)

FOREIGN PATENT DOCUMENTS

EP 3 996 003 A1 5/2022
JP 2019-101495 A 6/2019
(Continued)

OTHER PUBLICATIONS

JP Office Action for Japanese Patent Application 2022-079540 dated Oct. 21, 2025 (18 pages).

*Primary Examiner* — Bernard G Lindsay
(74) *Attorney, Agent, or Firm* — Foley & Lardner LLP

(57) ABSTRACT

According to one embodiment, an abnormality sign detection system comprising one or more computers configured to perform machine learning of an abnormality-sign detection-model that detects at least one of an abnormality in a target facility to be monitored and a sign of the abnormality, wherein the one or more computers are configured to: acquire a plurality of process amounts generated at the target facility; classify each of the plurality of process amounts into either correlation data for which correlation between the plurality of process amounts is learned or decorrelation data for which correlation between the plurality of process amounts is not learned; generate learning input data depending on classification, the learning input data being data in which each of the plurality of process amounts is associated with the correlation data or the decorrelation data; and perform the machine learning by inputting the learning input data to the abnormality-sign detection-model.

8 Claims, 14 Drawing Sheets

(56) References Cited

U.S. PATENT DOCUMENTS

| | | | |
|---|---|---|---|
| 2019/0163165 | A1 | 5/2019 | Gotou et al. |
| 2019/0334784 | A1* | 10/2019 | Kvernvik .............. H04W 24/08 |
| 2020/0311525 | A1 | 10/2020 | Kachman et al. |
| 2021/0065023 | A1 | 3/2021 | Naito et al. |
| 2021/0096551 | A1 | 4/2021 | Sayyarrodsari et al. |
| 2022/0043431 | A1* | 2/2022 | Sayyarrodsari .. G05B 19/41835 |
| 2022/0137611 | A1 | 5/2022 | Naito et al. |
| 2023/0120761 | A1* | 4/2023 | Krause ................. G05B 23/024 |
| 2024/0303971 | A1* | 9/2024 | Zhao ...................... G06V 10/30 |
| 2024/0312086 | A1* | 9/2024 | Goshen ................ A61B 6/5247 |

FOREIGN PATENT DOCUMENTS

| | | | |
|---|---|---|---|
| JP | 2020-035407 | A | 3/2020 |
| JP | 2021-033705 | A | 3/2021 |
| JP | 2021-047523 | A | 3/2021 |
| WO | WO-2013/030984 | A1 | 3/2013 |

* cited by examiner

ABNORMALITY DETECTION SYSTEM AND METHOD USING MACHINE LEARNING BASED ON CORRELATION OR DECORRELATION DATA

CROSS-REFERENCE TO RELATED APPLICATION

This application is based upon and claims the benefit of priority from Japanese Patent Application No. 2022-079540, filed on May 13, 2022, the entire contents of which are incorporated herein by reference.

TECHNICAL FIELD

Embodiments of the present invention relate to an abnormality sign detection technique.

BACKGROUND

In a large plant such as a nuclear power plant and a thermal power plant, a large number of process signals are monitored for the purpose of monitoring normality or soundness of various systems and devices constituting the plant. In recent years, as a technique for supporting plant monitoring, abnormality sign detection using artificial intelligence (AI) to be achieved by machine learning has been put to practical use. In this abnormality sign detection, it is in progress to use machine learning techniques having developed rapidly in recent years as an attempt to detect a sign of an abnormality before the abnormality becomes apparent. For example, in a known technique, failure prediction is performed by a machine learning model that has learned correlation between hundreds to thousands of process amount groups and changing patterns of process amounts in normal times as learning data.

During learning based on the learning data, even though there is no physical correlation between the plurality of process amounts, the trend of change in time series may accidentally resemble each other between the plurality of process amounts. This is called spurious correlation. If AI learns this spurious correlation, the following phenomenon occurs. That is, when a certain process amount changes, the prediction value of another process amount insusceptible to physical influence (from this certain process amount) also changes at the same time. This becomes a factor of causing erroneous detection. As a countermeasure for this erroneous detection, each process amount having no physical correlation is classified into different groups. Specifically, when change in a certain process amount has a little possibility of exerting physical influence on another process amount, this certain process amount is separated in advance into another model (for example, a model configured to: individually monitor process amounts for which correlation between process amounts is not learned; and monitor an abnormality sign). It is necessary to: avoid learning of the spurious correlation by performing learning in such a separated state; and thereby perform prediction of an abnormality in the plant with high accuracy.

As to a method of classification into a model that does not learn correlation between process amounts, there are no clear criteria and the method of classification is left to the user's discretion. Due to such unclear classification criteria, a huge amount of work occurs in classification judgment. Since classification accuracy depends on the skills of the user who performs the classification, the classification accuracy varies, and appropriate classification cannot be performed. For this reason, there is a concern that performance of an abnormality sign detection apparatus provided with a machine learning model does not improve as intended. Since this concern is ascribable to the spurious correlation between process amounts, not only the above-described techniques but also all the algorithms programmed to learn the correlation between process amounts have the same problem.

In view of the above-described circumstances, an object of embodiments of the present invention is to provide an abnormality sign detection technique that can suppress erroneous detection attributable to the spurious correlation.

DETAILED DESCRIPTION

In one embodiment of the present invention, an abnormality sign detection system comprising one or more computers configured to perform machine learning of an abnormality-sign detection-model that detects at least one of an abnormality in a target facility to be monitored and a sign of the abnormality, wherein the one or more computers are configured to: acquire a plurality of process amounts generated at the target facility; classify each of the plurality of process amounts into either (i) correlation data for which correlation between the plurality of process amounts is learned or (ii) decorrelation data for which correlation between the plurality of process amounts is not learned; generate learning input data depending on classification, the learning input data being data in which each of the plurality of process amounts is associated with the correlation data or the decorrelation data; and perform the machine learning by inputting the learning input data to the abnormality-sign detection-model.

According to embodiments of the present invention, it is possible to provide an abnormality sign detection technique that can suppress erroneous detection attributable to the spurious correlation.

Hereinbelow, embodiments of an abnormality sign detection system and an abnormality-sign detection-model generation method will be described in detail by referring to the accompanying drawings.

Figure 1:
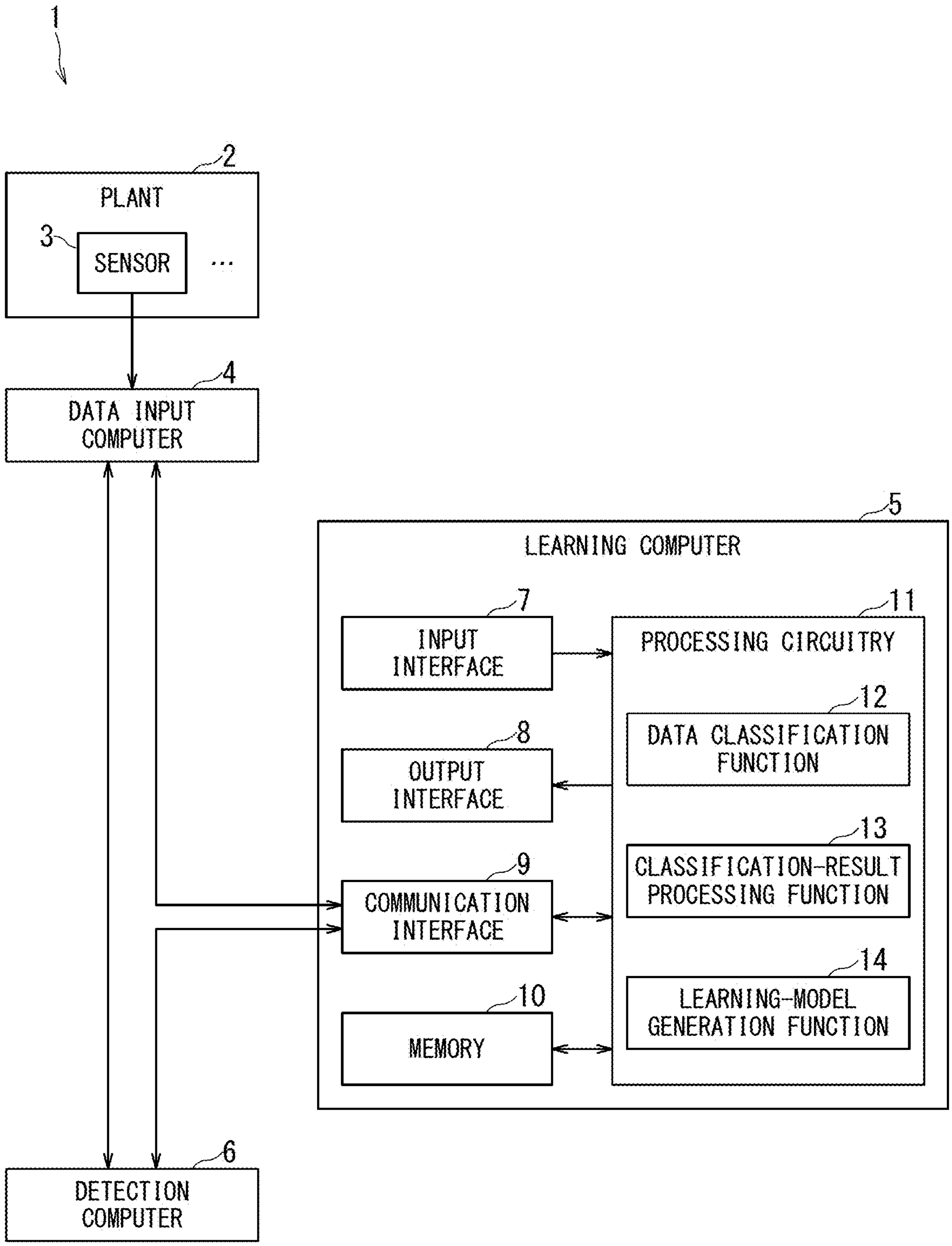
FIG. 1 is a block diagram illustrating a hardware configuration of an abnormality sign detection system.

The reference sign 1 in FIG. 1 denotes an abnormality sign detection system of the present embodiment. This abnormality sign detection system 1 uses (i.e., receives) data obtained from a target facility as input data so as to detect an abnormality or a sign of an abnormality in the target facility. The target facility to be monitored is, for example, a nuclear power plant, a thermal power plant, a manufactory, and a production facility. As the target facility of the present embodiment, such a plant 2 is illustrated.

Figure 2:
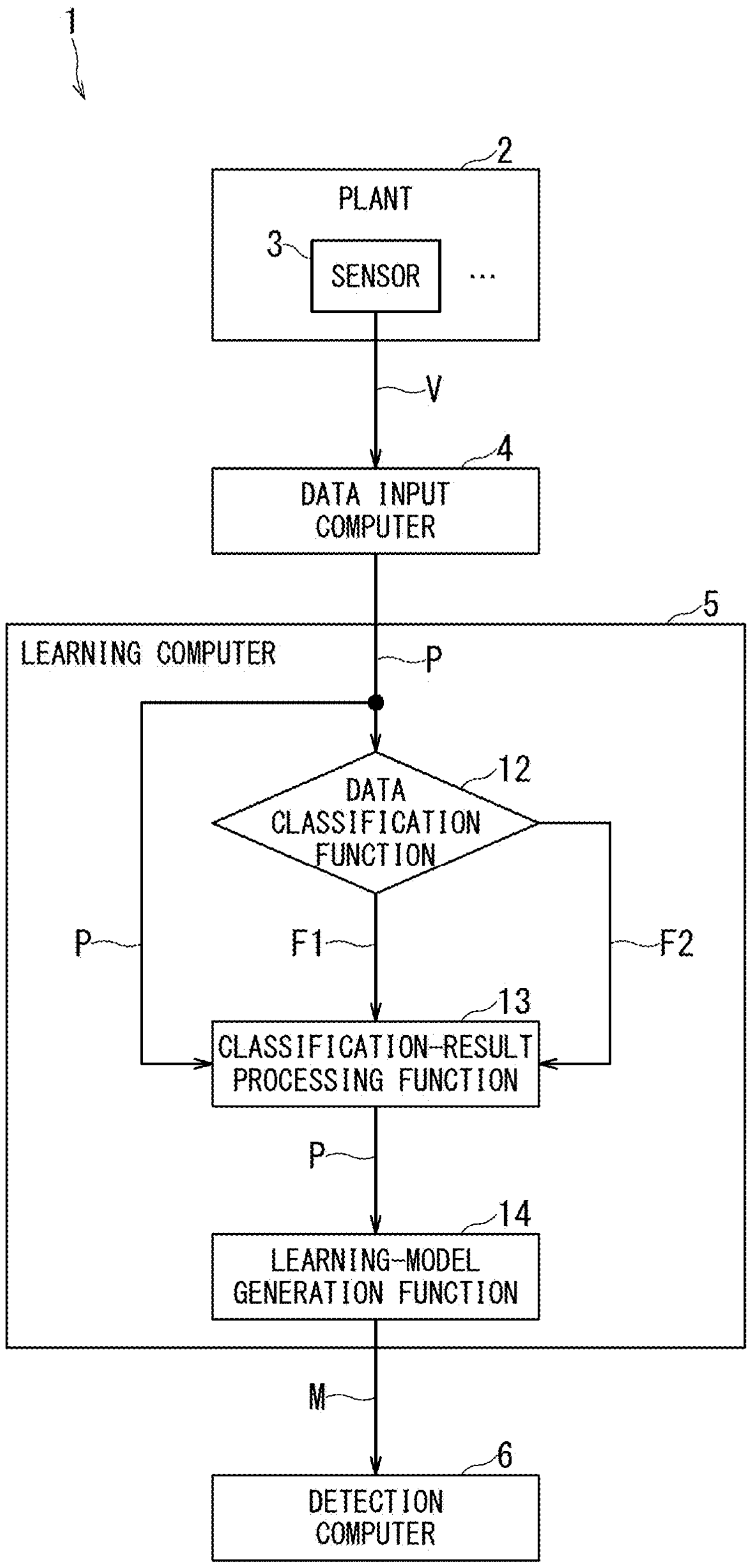
FIG. 2 is a functional block diagram illustrating a flow of processing to be executed by the abnormality sign detection system.

In addition, the plant 2 is provided with a large number of sensors 3. These sensors 3 are, for example, predetermined measuring instruments attached to predetermined devices such as piping, pumps and valves. Further, the sensors 3 acquire measured values as actually measured values that include information items indicative of the respective states of these devices. Many measured values to be obtained from these sensors 3 are referred to as process values V (FIG. 2). Note that the process values V also include a control signal to be outputted from a controller for controlling the devices. The process values V also include opening degree of each valve.

In the abnormality sign detection technique, an abnormality or its sign is detected by detecting a slight change in at least one process value V. In order to achieve this detection, it is necessary to determine the normal state of the plant 2 with high accuracy. Incorrect determination causes erroneous detection, which leads to unnecessary work for an operator. Further, in order to detect a slight change in the process value(s) V, it is necessary to make a highly accurate determination including a minute electrical noise signal that is difficult to be eliminated from the process value(s) V.

The number of the process values V to be acquired in the plant 2 is enormous. Thus, in the present embodiment, artificial intelligence (AI) to be achieved by machine learning is used to determine an abnormality or its sign (or indication) from this enormous number of the process values V.

For example, a learning model generated by machine learning using a neural network, a learning model generated by other machine learning, a deep learning algorithm, or a mathematical algorithm such as regression analysis can be used. In addition, forms of the machine learning include forms such as clustering and deep learning.

For example, the abnormality sign detection system 1 may be configured by a single computer that includes the neural network, or may be configured by a plurality of computers including the neural network.

The above-described neural network is a mathematical model that expresses the characteristics of brain functions by computer simulation. For example, artificial neurons (nodes) that form a network through synaptic connections change the synaptic connection strength through learning and show a model that has acquired problem-solving ability. Furthermore, the neural network acquires problem-solving ability by deep learning.

For example, the neural network is provided with intermediate layers composed of multiple layers. Each layer of the intermediate layers is composed of, for example, multiple units. In addition, feature amount in a pattern of change in state of a circuit or a system can be automatically extracted by causing the multilayer neural network to learn in advance with the use of learning data (training data). On a user interface, the multilayer neural network can set arbitrary number of intermediate layers, arbitrary number of units, arbitrary learning rate, arbitrary number of times of learning, and arbitrary activation function.

In the present embodiment, a description will be given of an abnormality sign detection technique in which an autoencoder (encoder-decoder network) is used. The learning model of the present embodiment is achieved by this autoencoder. Note that other algorithms except the autoencoder may be applied to the machine learning of the present embodiment.

During the machine learning, there occurs spurious correlation in which the trend of change in time series accidentally resemble each other between a plurality of process amounts despite non-existence of physical correlation between these process amounts. If AI learns the spurious correlation, it becomes a factor of causing erroneous detection. However, in the present embodiment, learning of the spurious correlation is avoided and thereby an abnormality sign of the plant 2 is detected with high accuracy.

As shown in FIG. 1, the abnormality sign detection system 1 includes: a data input computer 4; a learning computer 5; and a detection computer 6. These are include hardware resources such as a Central Processing Unit (CPU), a Read Only Memory (ROM), a Random Access Memory (RAM) and/or a Hard Disk Drive (HDD), and are configured as a computer in which information processing by software is achieved with the use of the hardware resources by causing the CPU to execute various programs. Further, the abnormality-sign detection-model generation method of the present embodiment is achieved by causing the computer to execute the various programs.

The data input computer 4 collects the process values V acquired by the sensors 3 provided in the plant 2. This data input computer 4 is, for example, a server for storing plant information. The collected process values V are sent to the learning computer 5 or the detection computer 6.

The learning computer 5 generates an abnormality-sign detection-model M (FIG. 2) that detects at least one of: an abnormality of the plant 2; and a sign of an abnormality of the plant 2. The generated abnormality-sign detection-model M is sent to the detection computer 6.

The detection computer 6 uses the abnormality-sign detection-model M to detect at least one of: the abnormality of the plant 2; and its sign.

Although the respective components of the abnormality sign detection system 1 are installed in the individual computers, these components do not necessarily need to be achieved by a plurality of computers. For example, one computer may integrally achieve the respective components of the abnormality sign detection system 1.

The learning computer 5 includes: an input interface 7; an output interface 8; a communication interface 9; a memory 10; and processing circuitry 11.

The input interface 7 receives input of predetermined information in response to an operation by a user using the learning computer 5. This input interface 7 includes an input device such as a mouse and a keyboard. In other words, the predetermined information is inputted to the input interface 7 in response to the operation on these input devices.

The output interface 8 outputs predetermined information. For example, the learning computer 5 includes a device for displaying images, such as a display configured to output analysis results. In other words, the output interface 8 controls images to be displayed on the display. In addition, the display may be separated from the computer main-body or may be integrated with the computer main-body.

The communication interface 9 communicates with the data input computer 4 or the detection computer 6 via a predetermined communication line. In the present embodiment, the data input computer 4, the learning computer 5, and the detection computer 6 are connected to each other via a LAN (Local Area Network).

The memory 10 stores various information items that are necessary for generating the abnormality-sign detection-model M. For example, the memory 10 stores the process values V (FIG. 2) sent from the data input computer 4.

The processing circuitry 11 has: a data classification function 12; a classification-result processing function 13; and a learning-model generation function 14. These functions are implemented by causing the CPU to execute the programs stored in the memory or HDD.

Next, the processing flow of the abnormality sign detection system 1 will be described by referring to FIG. 2.

The arrows in FIG. 2 are one possible interpretation indicative of the flow of processing, and there may be another flow of processing except the illustrated arrows. In addition, the anteroposterior relationship of the respective processes or components of FIG. 2 is not necessarily fixed but may be exchanged. One or more processes of FIG. 2 may be executed in parallel with another process. Furthermore, the abnormality sign detection system 1 may include components other than the configuration shown in FIG. 2, and part of the components shown in FIG. 2 may be omitted.

First, each sensor 3 provided in the plant 2 acquires the process values V generated in this plant 2. The process values V obtained by these sensors 3 are then collected into the data input computer 4.

The data input computer 4 associates each acquired process value V with ID (identification information) of the corresponding sensor 3 such as a sensor management number and a sensor name, and then outputs the process values V as the process amounts P. That is, each of the plurality of process values V related to the plant 2 is converted into the corresponding process amount P, which is in the format to be used for the machine learning of the abnormality-sign detection-model M. These process amounts P are sent to the learning computer 5.

The learning computer 5 performs preprocessing of the learning input data (i.e., signals for input) to be inputted to the neural network. For example, the learning computer 5 acquires the plurality of process amounts P sent from the data input computer 4, and then each of the process amounts P is inputted to the data classification function 12.

The data classification function 12 classifies each of the process amounts P into either: correlation data for which the correlation between these process amounts P is learned; or decorrelation data for which the correlation between these process amounts P is not learned, on the basis of at least one condition. The data classification function 12 outputs a physical-correlation-signal determination flag F1 when the process amount P is classified into the correlation data, and outputs a single-monitoring-signal determination flag F2 when the process amount P is classified into the decorrelation data. The physical-correlation-signal determination flag F1 and the single-monitoring-signal determination flag F2 are inputted to the classification-result processing function 13.

The physical correlation signal is a process amount P that has no possibility of inducing influenced erroneous change due to the spurious correlation. The single monitoring signal is a process amount P that has a possibility of inducing the influenced erroneous change due to the spurious correlation.

The classification-result processing function 13 associates each process amount P classified into the correlation data with the physical-correlation-signal determination flag F1, and associates each process amount P classified into the decorrelation data with the single-monitoring-signal determination flag F2. Each process amount P with the physical-correlation-signal determination flag F1 and each process amount P with the single-monitoring-signal determination flag F2, both of which are outputted from the classification-result processing function 13, are inputted to the learning-model generation function 14. In other words, the classification-result processing function 13 generates the learning input data in which each processing amount P is associated with the correlation data or the decorrelation data on the basis of the classification executed by the data classification function 12. The learning input data are inputted to the learning-model generation function 14.

The plurality of process amounts P to be used for the learning input data are classified into a plurality of groups, for example, into system groups of the plant 2, as exemplified by: a water supply system; a condensation system; a power distribution system; and a control system. The machine learning is performed for each system group of the plant 2. Note that at least one process amount P associated with the correlation data changes correspondingly in response to change in another process amount P in the same group. Conversely, at least one process amount P associated with the decorrelation data does not change when another process amount P in the same group changes. In this manner, the machine learning can be performed appropriately even when the plurality of process amounts P individually associated with either the correlation data or the decorrelation data belong to the same group.

The learning-model generation function 14 performs the machine learning by inputting the learning input data to the abnormality-sign detection-model M. The machine learning is performed in such a manner that: each process amount P with the physical-correlation-signal determination flag F1 is treated as a physical correlation signal (i.e., as a process amount P reflecting the correlation with another process amount P); and each process amount P with the single-monitoring-signal determination flag F2 is treated as a single monitoring signal (i.e., as an independent process amount P for which the correlation with other process amounts P is not reflected). The abnormality-sign detection-model M generated by the learning-model generation function 14 is set in the detection computer 6.

The detection computer 6 performs the abnormality sign detection by using the autoencoder. For example, the detection computer 6 acquires the plurality of process amounts P sent from the data input computer 4. The detection computer 6 inputs these process amounts P as the determination input data to an input layer of the learned abnormality-sign detection-model M. The detection computer 6 acquires the determination output data, in which the respective normal states of the plurality of process amounts P are restored, outputted from an output layer of the abnormality-sign detection-model M in response to the input of the determination input data. The detection computer 6 determines presence or absence of at least one of an abnormality or a sign of an abnormality in the plant 2 on the basis of the difference between the determination input data and the determination output data. In the present embodiment, even in the case of performing the abnormality sign detection by using the autoencoder, detection accuracy can be improved by suppressing erroneous detection.

This abnormality-sign detection-model M includes the input layer, the intermediate layer, and the output layer. The input layer receives the learning input data or the determination input data. The output layer outputs the determination output data in response to the input of the determination input data. In the intermediate layer, the parameters are machine-learned by the learning input data. The abnormality-sign detection-model M causes the detection computer 6 to determine presence or absence of at least one of an abnormality or a sign of an abnormality in the plant 2 on the basis of the difference between the determination input data and the determination output data.

Next, aspects of the classification to be performed by the data classification function 12 will be described by referring to FIG. 3.

Figure 3:
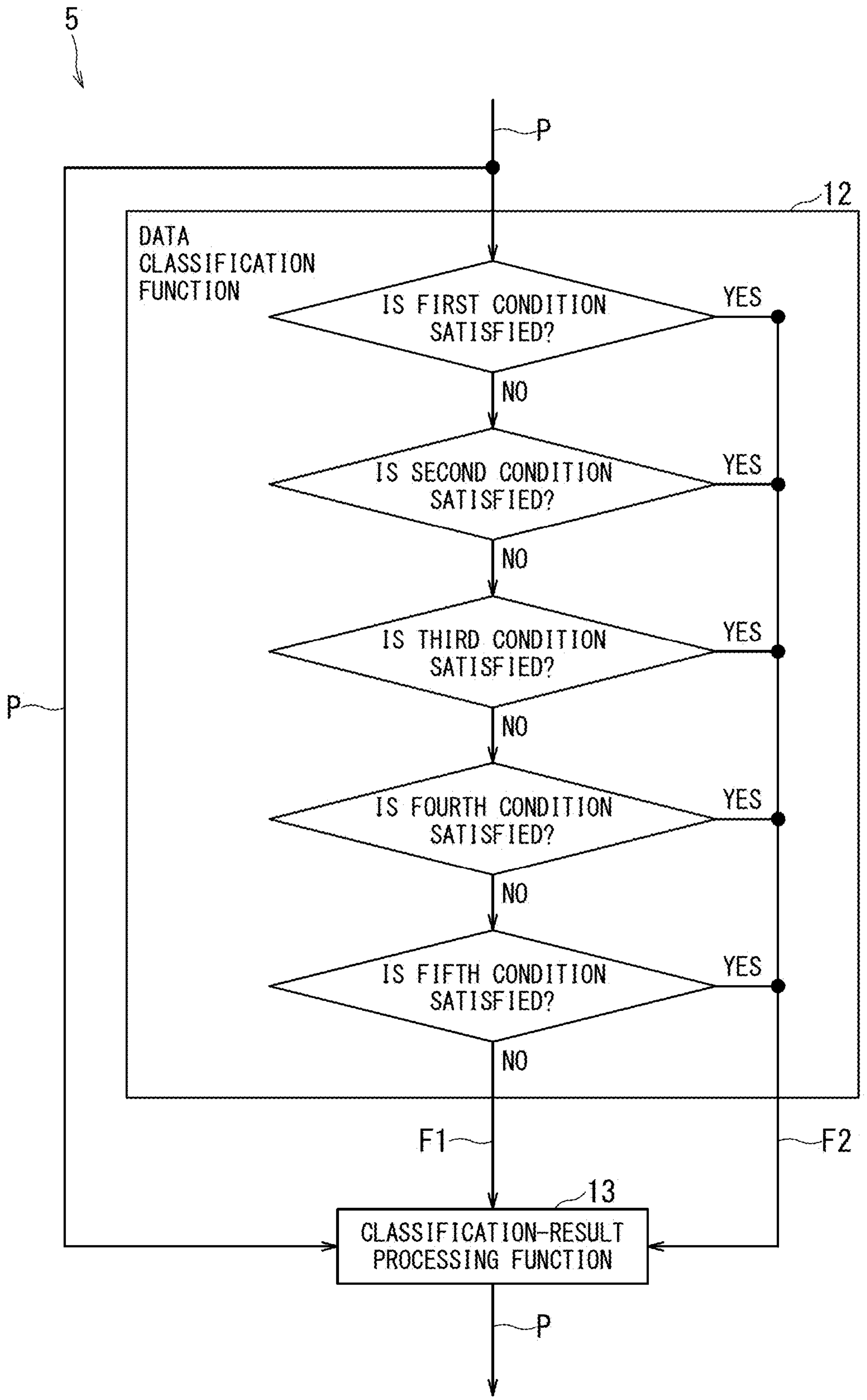
FIG. 3 is a functional block diagram illustrating the flow of processing to be achieved by a data classification function.

As shown in FIG. 3, the data classification function 12 classifies the process amounts P inputted from the data input computer 4 on the basis of a plurality of classification conditions. For example, first to fifth classification conditions are set in advance. Depending on these classification results, the physical-correlation-signal determination flag F1 or the single-monitoring-signal determination flag F2 is inputted to the classification-result processing function 13.

For example, if any one of the first to fifth classification conditions is satisfied (i.e., YES in at least one step), the single-monitoring-signal determination flag F2 is inputted to the classification-result processing function 13. Conversely, if none of the first to fifth classification conditions are satisfied (i.e., NO in all the steps), the physical-correlation-signal determination flag F1 is inputted to the classification-result processing function 13.

Next, the first to fifth classification conditions will be described by referring to FIG. 4 to FIG. 13B.

In each graph (FIGS. 5A, 5B, 7A, 7B, 7C, 9A, 9B, 9C, 11A, 11B, 13A, and 13B) described below, the process amounts P obtained during the learning period constitute the learning input data, and the process amounts P obtained during the monitoring period constitute the determination input data. In each graph, the solid line indicates the measured value, and the dashed line indicates the predicted value to be generated by the abnormality-sign detection-model M. The measured value in the learning period (solid line) becomes the learning input data. Further, the actually measured value in the monitoring period (solid line) becomes the determination input data, and the predicted value in the monitoring period (dashed line) becomes the determination output data.

First, the first classification condition will be described. In the first classification condition, each process amount P (FIG. 3) to be presumed to become a fixed value is classified as the single monitoring signal in terms of operation. This classification suppresses the influential erroneous change due to the spurious correlation between the process amounts P that are presumed to take or converge to fixed values.

Figure 4:
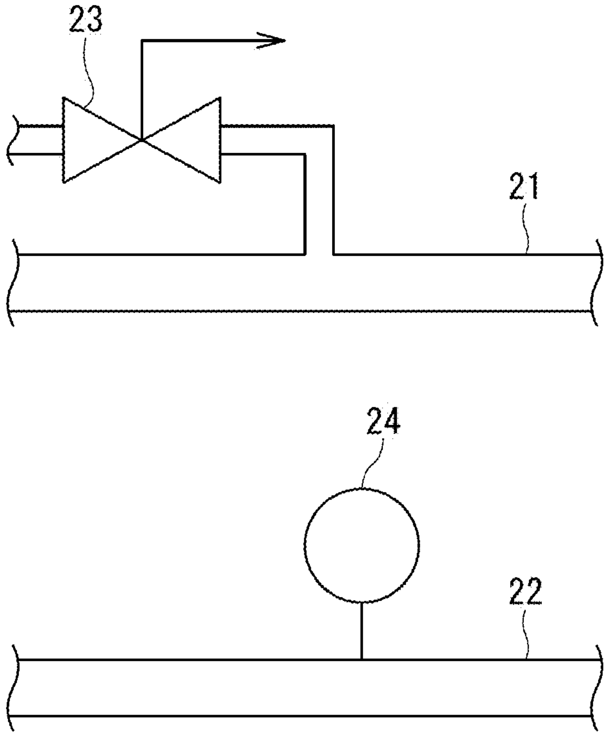
FIG. 4 is a configuration diagram illustrating a device to be operated by a fixed value.
Figures 5A, 5B:
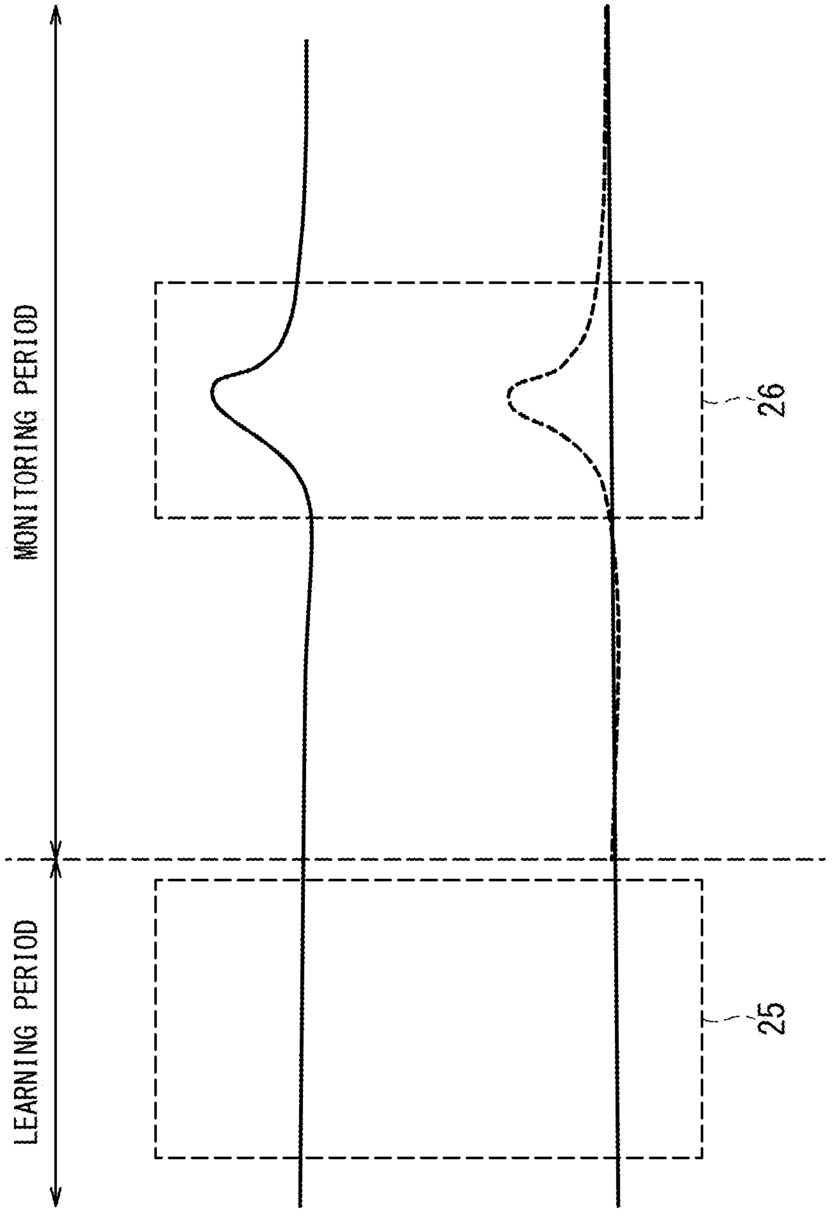
FIG. 5A is a graph illustrating a flow-regulating-valve opening-degree signal of first-system piping.
FIG. 5B is a graph illustrating a flow rate of second-system piping.

For example, it is assumed that first-system piping 21 and second-system piping 22 are provided as shown in FIG. 4. The first-system piping 21 is provided with a flow regulating valve 23. The second-system piping 22 is provided with a flowmeter 24 for measuring its flow rate. On the basis of an opening degree signal (i.e., process amount P) of the flow regulating valve 23, the graph of FIG. 5A is obtained. On the basis of the measured value (i.e., process amount P) of the flowmeter 24, the graph of FIG. 5B is obtained.

When the device from which the process amount P (FIG. 3) is obtained is assumed to be operated by a fixed value like the flow regulating valve 23, physical correlation is not established between the opening degree signal indicative of the opening/closing state of the flow regulating valve 23 and the flow rate of the second-system piping 22. However, in the case where the trends of both process amounts P in the learning period are similar to each other, this case is treated and learned as that the correlation (spurious correlation) is established between the process amounts P, by the abnormality-sign detection-model M.

For example, in the case where both the opening degree signal of the flow regulating valve 23 and the flow rate of the second-system piping 22 accidentally show the same trend such as convergence to a constant value in a certain part 25 of the learning period, this case is treated and learned as that the correlation (spurious correlation) is established between both process amounts P.

As a result, the predicted flow rate of the second-system piping 22 is subjected to the influential erroneous change (i.e., erroneously changes by being influenced by another process amount P that is accidentally and erroneously learned as having correlation therewith). For example, during a certain part 26 of the monitoring period, the opening degree signal of the flow regulating valve 23 changes under the influence of noise in some cases. In this case, even though the process amount P for the flow regulating valve 23 changes due to its own factor (i.e., factor irrelevant to other components), the predicted value of the flow rate of the second-system piping 22, for which the correlation with the flow regulating valve 23 has been erroneously learned, may change at the same time.

In other words, the predicted flow rate (i.e., determination output data) for the second-system piping 22 is caused to differ from the actual flow rate (i.e., determination input data) after mis-learning. Consequently, even though the actual flow rate of the second-system piping 22 does not have an abnormality, it is erroneously determined to have an abnormality.

For this reason, the single-monitoring-signal determination flag F2 (FIG. 3) is assigned to each process amount P, which takes a fixed value in terms of operation like the opening degree signal of the flow regulating valve 23, and such a process amount P with the single-monitoring-signal determination flag F2 is classified as a process amount P for which correlation is not learned.

When a device is operated under the state where at least one process amount P regarding this device is fixed to a predetermined value, the data classification function 12 (FIG. 3) of the present embodiment classifies this at least one process amount P into the decorrelation data. In this manner, the process amount P is classified on the basis of whether it is a fixed value or not, and thus, the classification can be appropriately performed.

Next, the second classification condition will be described. In the second classification condition, in a system with redundant devices, each process amount P (FIG. 3), which causes the influential erroneous change based on change in correlation due to switching of operating conditions, is classified as the single monitoring signal. This classification suppresses the influential erroneous change due to switching of operating conditions of redundant devices.

Figure 6:
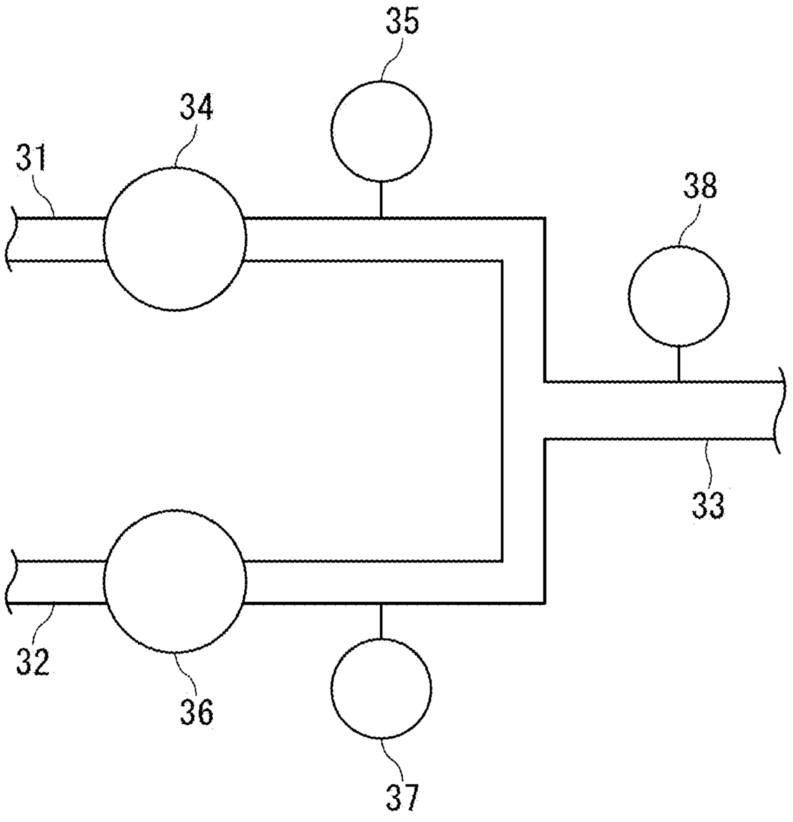
FIG. 6 is a configuration diagram illustrating a system having redundant devices.
Figures 7A, 7B, 7C:
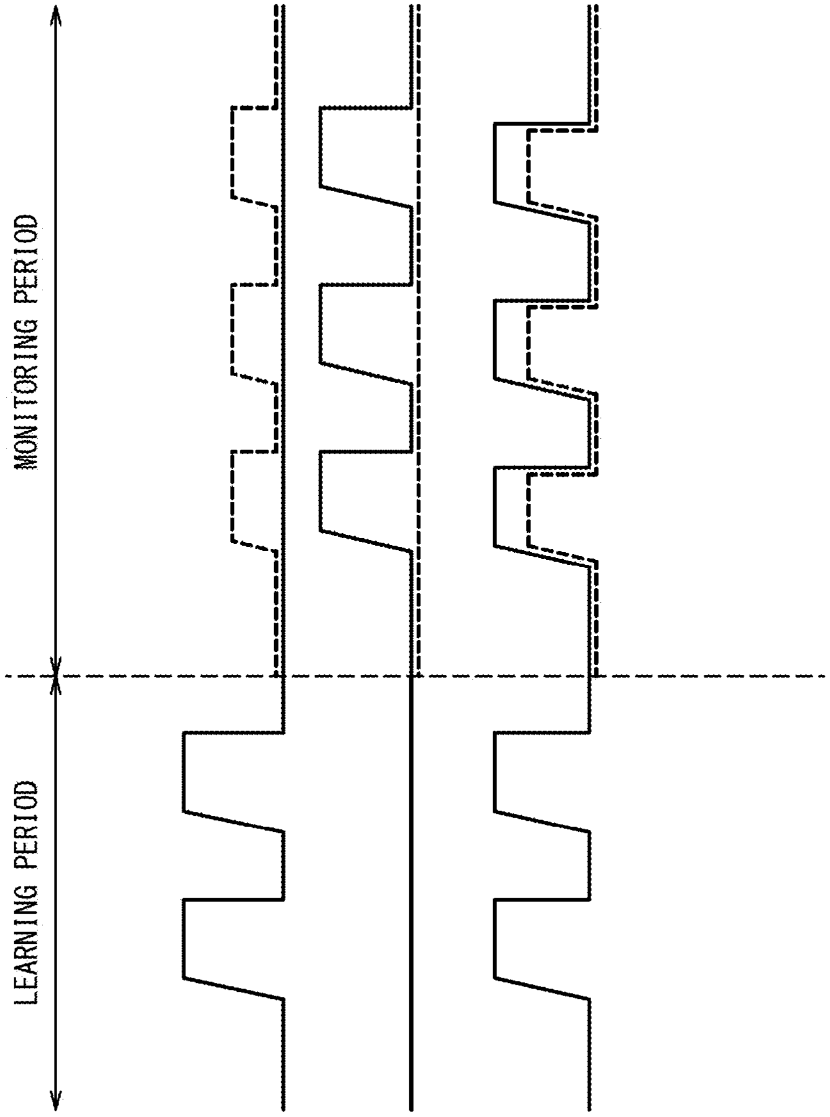
FIG. 7A is a graph illustrating discharge pressure of a first pump.
FIG. 7B is a graph illustrating discharge pressure of a second pump.
FIG. 7C is a graph illustrating a flow rate of piping.

As shown in FIG. 6, a system in which a first pipe 31 and a second pipe 32 join in the middle to form a third pipe 33 is assumed to be provided, for example. The first pipe 31 is provided with a first pump 34 and a first pressure gauge 35 for measuring the discharge pressure of the first pump 34. The second pipe 32 is provided with a second pump 36 and a second pressure gauge 37 for measuring the discharge pressure of the second pump 36. The third pipe 33 is provided with a flowmeter 38 for measuring its flow rate. On the basis of the discharge pressure (i.e., process amount P) obtained by the first pressure gauge 35, the graph of FIG. 7A is obtained. On the basis of the discharge pressure (i.e., process amount P) obtained by the second pressure gauge 37, the graph of FIG. 7B is obtained. On the basis of the flow rate (i.e., process amount P) of the third pipe 33 obtained by the flowmeter 38, the graph of FIG. 7C is obtained.

It is assumed that the system is made redundant by the first pump 34 and the second pump 36. The conditions for the redundant operation for the first pump 34 and the second pump 36 are selected by an operator. For example, during the learning period, only the first pump 34 as one of both is operated at all times. In addition, during the learning period, the second pump 36 as the other of both remains stopped.

During the learning period, when only the first pump 34 is in operation, the abnormality-sign detection-model M learns the correlation between: the discharge pressure of the first pump 34 indicative of the operating state; and the flow rate of the third pipe 33 indicative of the control state of the entire system. During the learning period, the discharge pressure of the stopped second pump 36 does not change, and thus, correlation between the discharge pressure of the second pump 36 and the flow rate of the third pipe 33 is not learned.

For example, during the monitoring period, the conditions of the redundant operation may change in response to selection input by the operator so that the first pump 34 is stopped and only the second pump 36 is in operation. In such a case, due to the flow rate of the third pipe 33 in conjunction with the discharge pressure of the second pump 36, the predicted value of the discharge pressure of the first pump 34, for which correlation with the flow rate of the third pipe 33 is learned, causes the influential erroneous change. In addition, the predicted value of the flow rate of the third pipe 33 is also affected so as to result in the influential erroneous change.

In other words, the respective predicted values (i.e., determination output data) of the discharge pressure of the first pump 34 and the flow rate of the third pipe 33 are caused to differ from the actually measured values (i.e., determination input data). As a result, even though there is no abnormality in the actual discharge pressure of the first pump 34 and the actual flow rate of the third pipe 33, it is erroneously determined to have an abnormality.

For this reason, the process amounts P of the respective discharge pressures of the first pump 34 and the second pump 36, which change in correlation relationship due to the switching of operating conditions, are assigned with single-monitoring-signal determination flags F2 (FIG. 3) and are classified as the process amounts P for which correlation is not learned.

In the case where the correlation between at least one process amount P and another process amount P does not change at the time of switching one or more operating conditions of the plant 2, the data classification function 12 (FIG. 3) of the present embodiment classifies this at least one process amount P into the decorrelation data. In this manner, the process amounts P are classified on the basis of whether there is change at the time of switching the operating condition(s) of part of the plant 2, and thus, the classification can be appropriately performed.

Next, the third classification condition will be described. In the third classification condition, in a system with devices that operate intermittently depending on operation input by the operator, each process amount P (FIG. 3) causing the influential erroneous change due to the spurious correlation is classified as the single monitoring signal. This classification suppresses the influential erroneous change due to the spurious correlation between devices that operate intermittently.

Figure 8:
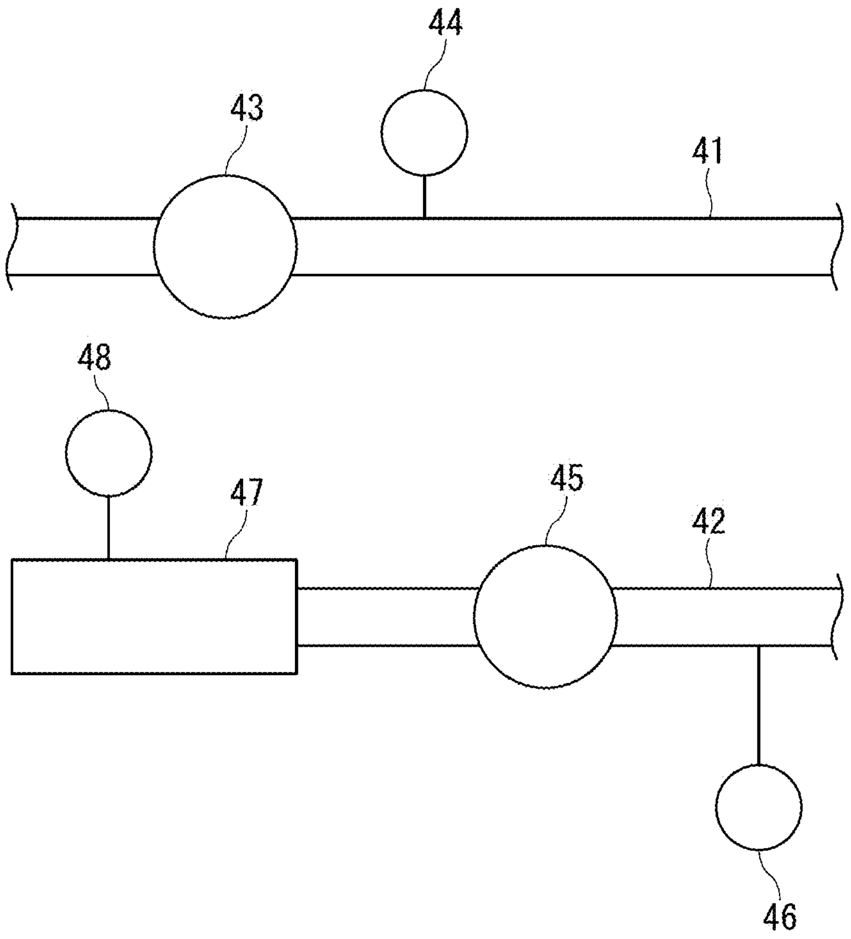
FIG. 8 is a configuration diagram illustrating a system provided with a device that operates intermittently.
Figures 9A, 9B, 9C:
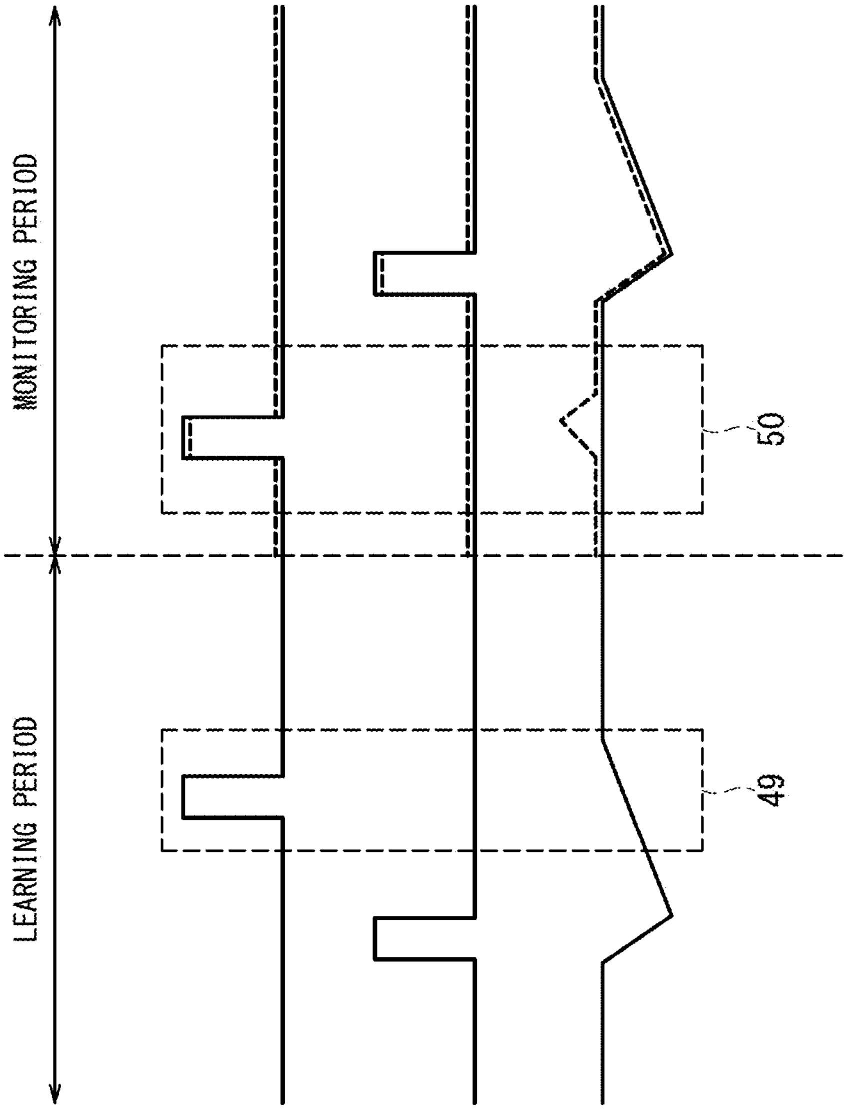
FIG. 9A is a graph illustrating discharge pressure of a first pump.
FIG. 9B is a graph illustrating discharge pressure of a second pump.
FIG. 9C is a graph illustrating water level of a tank.

For example, it is assumed that there are first-system piping 41 and second-system piping 42 as shown in FIG. 8. The first-system piping 41 is provided with a first pump 43 and a first pressure gauge 44. The second-system piping 42 is provided with: a second pump 45; a second pressure gauge 46; a tank 47; and a water level indicator 48. On the basis of the discharge pressure (i.e., process amount P) obtained by the first pressure gauge 44, the graph of FIG. 9A is obtained. On the basis of the discharge pressure (i.e., process amount P) obtained by the second pressure gauge 46, the graph of FIG. 9B is obtained. On the basis of the water level (i.e., process amount P) of the tank 47 obtained by the water level indicator 48, the graph of FIG. 9C is obtained.

For example, it is assumed that the normality of the devices is checked by regular operation by the operator. Although physical correlation is established between the discharge pressure of the second pump 45 provided in the second-system piping 42 and the water level of the tank 47, physical correlation is not established between the discharge pressure of the first pump 43 provided in the first-system piping 41 and the water level of the tank 47 provided in the second-system piping 42. However, the span during which the discharge pressure of the first pump 43 maintains a certain value overlaps (at least partially) with the span during which the water level of the tank 47 maintains a certain value, and this trend is treated and learned as that correlation (spurious correlation) between both process amounts P is established.

For example, it is assumed that the second pump 45 is operated during a certain part 49 of the learning period. During this operation, the discharge pressure indicating the operating state of the second pump 45 and the water level of the tank 47 change in conjunction with each other. At this time, in the case where the first pump 43 is accidentally operated at the timing when the water level of the tank 47 changes due to the operation of the second pump 45, this case is erroneously treated and learned as that correlation is established between change in the discharge pressure indicative of the operating state of the first pump 43 and change in the water level of the tank 47.

As a result, when the first pump 43 is operated during a certain part 50 of the monitoring period, the predicted value of the water level of the tank 47, for which the above-described correlation is erroneously learned, causes the influential erroneous change so as to change along with the discharge pressure of the first pump 43.

In other words, after the mis-learning, the predicted value of the water level of the tank 47 (i.e., determination output data) is caused to differ from the actually measured value (i.e., determination input data). As a result, even though there is no abnormality in the actual water level of the tank 47, it is erroneously determined to have an abnormality.

In such a case, the discharge pressure of the second pump 45 may also be treated and learned as having correlation with change in another process amount P that intermittently changes and actually has no physical correlation therewith.

For this reason, the single-monitoring-signal determination flag F2 (FIG. 3) is assigned to the process amount P of each device that operates intermittently, as exemplified by the discharge pressure of the first pump 43 and the discharge pressure of the second pump 45, and such a process amount P with the single-monitoring-signal determination flag F2 is classified as a process amount P for which correlation is not learned.

When at least one process amount P changes due to intermittent operation of part of the plant 2 (FIG. 2), the data classification function 12 (FIG. 3) of the present embodiment classifies this at least one process amount P into the decorrelation data. In this manner, each process amount P is classified on the basis of whether intermittent operation is assumed for the device related to this process amount P or not, and thus, the classification can be performed appropriately.

Next, the fourth classification condition will be described. In the fourth classification condition, each process amount P (FIG. 3), which is influenced by an external factor such as climate and thereby causes the influential erroneous changes, is classified as the single monitoring signal. This classification suppresses the influenced erroneous change due to the spurious correlation in each device, process amount of which changes under the influence from the external factor.

Figure 10:
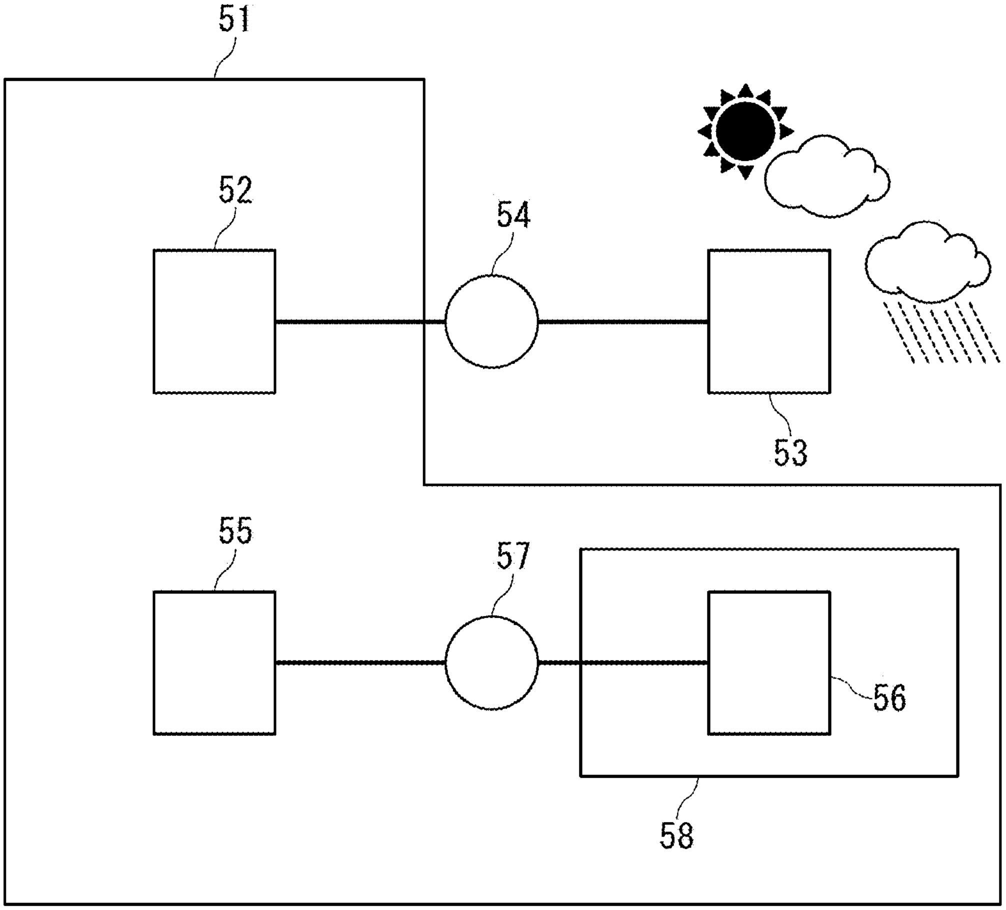
FIG. 10 is a configuration diagram illustrating a device, process amount of which changes under the influence of external environment.
Figures 11A, 11B:
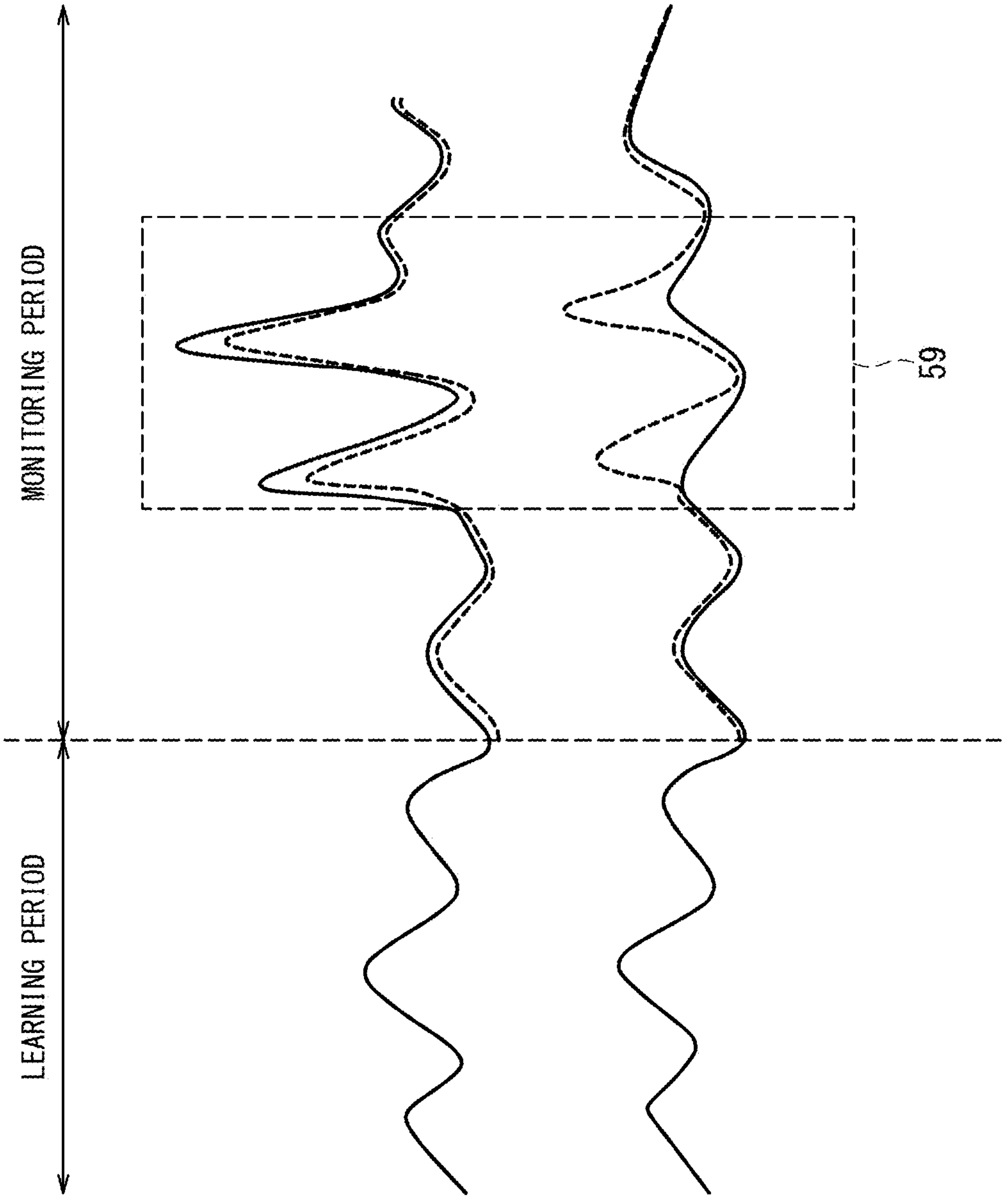
FIG. 11A is a graph illustrating internal and external differential pressure of a building.
FIG. 11B is a graph illustrating indoor differential pressure.

As shown in FIG. 10, it is assumed that there is a predetermined building 51. There is provided a first pressure gauge 54 that measures the differential pressure between a first device 52 inside the building 51 and a second device 53 outside the building 51. There is provided a second pressure gauge 57 configured to measure the differential pressure between a third device 55 and a fourth device 56, both of which are inside this building 51. Note that the fourth device 56 is provided in a room 58 different from the installation place of the third device 55. On the basis of an internal and external differential pressure of the building 51 (i.e., process amount P), which is the differential pressure between the inside and outside of the building 51 and is obtained by the first pressure gauge 54, the graph of FIG. 11A is obtained. On the basis of an indoor differential pressure (i.e., process amount P) that is the differential pressure between internal components in the building 51 and is obtained by the second pressure gauge 57, the graph of FIG. 11B is obtained. Since the second device 53 is provided outside the building 51, the second device 53 is more susceptible to the external environment such as change in atmospheric pressure.

For example, during the learning period, due to fluctuation in atmospheric pressure, the respective measured values of the first pressure gauge 54 and the second pressure gauge 57 fluctuate. In the case where the first pressure gauge 54 and the second pressure gauge 57 having no physical correlation with each other show similar fluctuation, due to the similar trend in the learning period, this case is treated and learned as that the correlation (spurious correlation) is established between the respective process amounts P of the first pressure gauge 54 and the second pressure gauge 57.

As a result, the predicted values may be subjected to the influential erroneous change. For example, during a certain part 59 of the monitoring period, the internal and external differential pressure of the building (i.e., process amount P) measured by the first pressure gauge 54 fluctuates due to the external factor such as weather and wind in some cases. In such cases, the predicted value of the indoor differential pressure (i.e., process amount P) of the second pressure gauge 57 learned as having correlation causes the influential erroneous change.

In other words, the predicted value (i.e., determination output data) of the internal pressure to be measured by the second pressure gauge 57 is caused to differ from the actually measured value (i.e., determination input data) after the mis-learning. Consequently, even though there is no abnormality in the actual indoor differential pressure, it is erroneously determined to have an abnormality.

Since there are countless variation patterns caused by such external environment, it is generally difficult to learn all of the variation patterns. For this reason, the single-monitoring-signal determination flag F2 (FIG. 3) is assigned to each process amount P that changes or fluctuates under the influence of the external environment such as the internal and external differential pressure of the building, and such a process amount is classified as the process amount P for which correlation is not learned.

When at least one process amount P changes due to the external environment of the plant 2 (FIG. 2), the data classification function 12 (FIG. 3) of the present embodiment classifies this at least one process amount P into the decorrelation data. In this manner, each process amount P is classified on the basis of whether it changes due to the external environment of the plant 2 or not, and thus, the classification can be performed appropriately.

Next, the fifth classification condition will be described. In the fifth classification condition, each process amount P (FIG. 3) with sudden change (or abrupt change) that cannot be covered by the learning period is classified as the single monitoring signal. This classification suppresses the influential erroneous change due to the spurious correlation between process amounts that cause the sudden change.

The sudden change means unexpected or rapid change that is also change in at least one process amount P with reference to a predetermined threshold value.

For example, the sudden change is defined as change that occurs in a period shorter than the sampling period of the process amount P. If the process amount P changes in a period shorter than the sampling period, the value of the process amount P changes innumerably due to slight deviation in sampling timing. As to such change, it is impossible to learn all the patterns.

Figure 12:
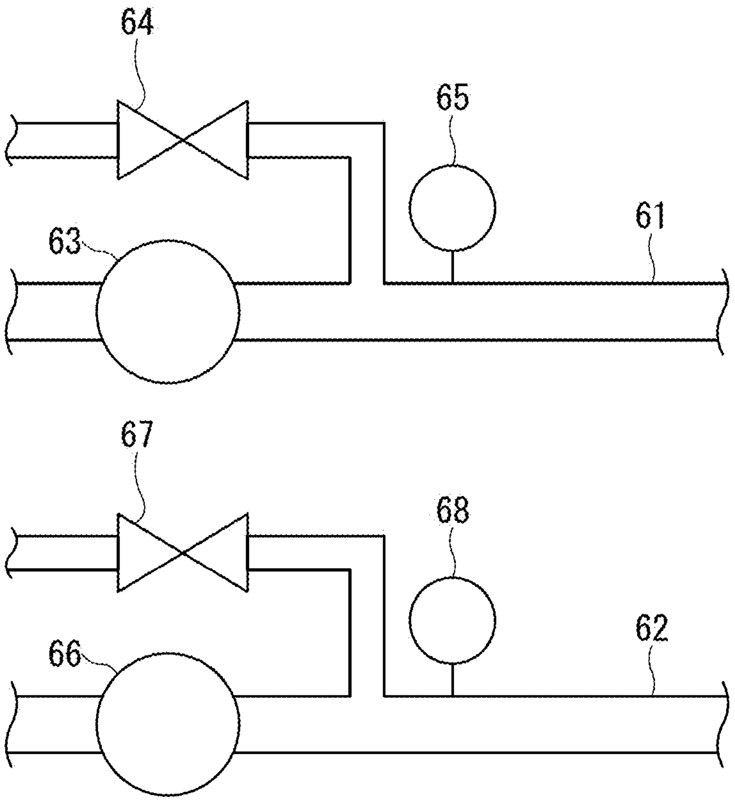
FIG. 12 is a configuration diagram illustrating a device, process amount of which causes sudden change.
Figures 13A, 13B:
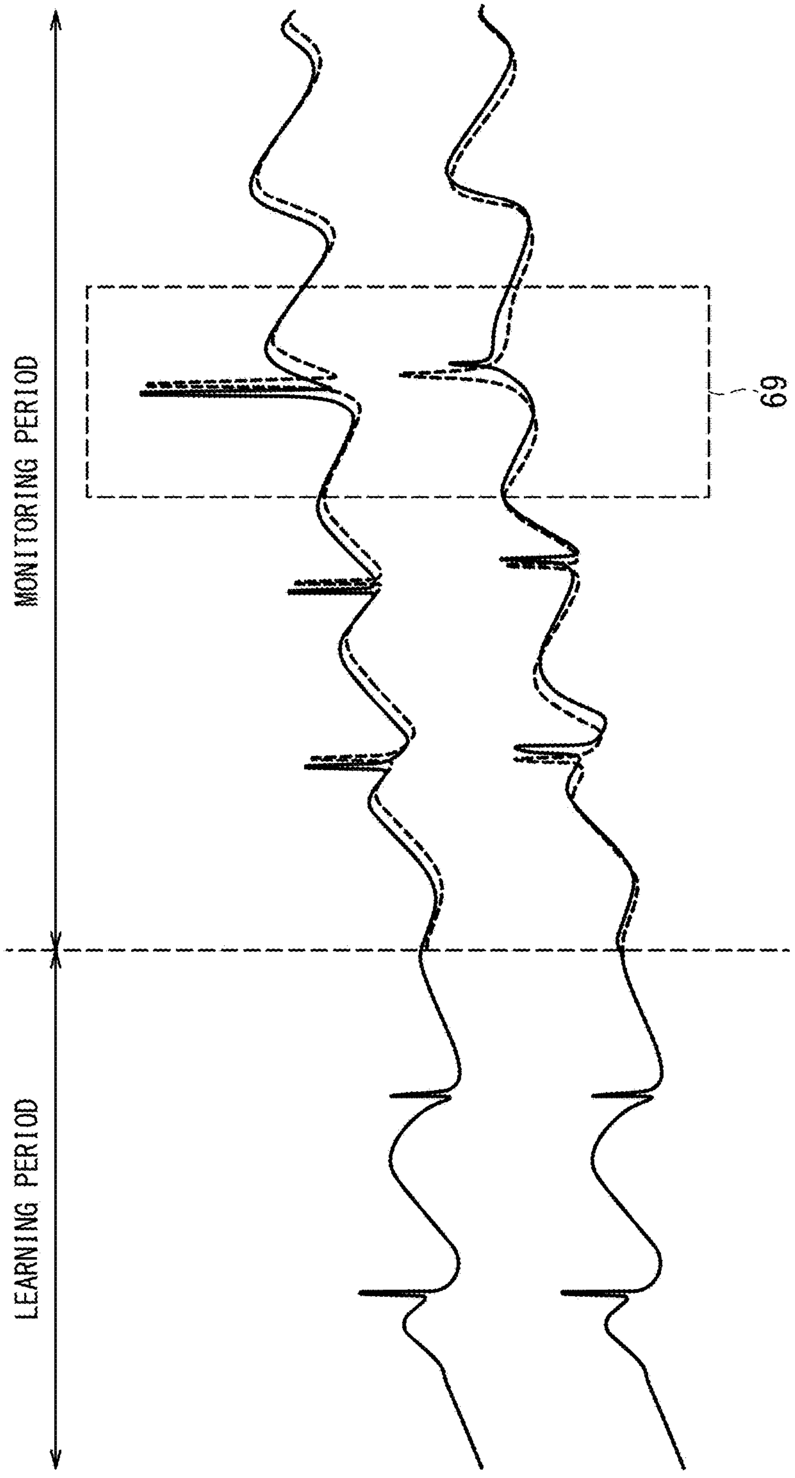
FIG. 13A is a graph illustrating a flow rate of a first system.
FIG. 13B is a graph illustrating a flow rate of a second system.

For example, it is assumed that first-system piping 61 and second-system piping 62 are provided as shown in FIG. 12. The first-system piping 61 is provided with: a first pump 63; a first flow regulating valve 64; and a first flowmeter 65. The second-system piping 62 is provided with: a second pump 66; a second flow regulating valve 67; and a second flowmeter 68. On the basis of the flow rate (i.e., process amount P) of the first-system piping 61 to be measured by the first flowmeter 65, the graph of FIG. 13A is obtained. On the basis of the flow rate (i.e., process amount P) of the second-system piping 62 to be measured by the second flowmeter 68, the graph of FIG. 13B is obtained.

During the learning period, depending on conditions such as: the respective operating conditions of the first pump 63 and the second pump 66; and the respective driving conditions of the first flow regulating valve 64 and the second flow regulating valve 67, the first-system piping 61 and the second-system piping 62 have similar trend in change in flow rate including the sudden change in some cases. Such cases are treated and (erroneously) learned as that the correlation (spurious correlation) is established between the process amounts.

As a result, in a certain part 69 of the monitoring period, when the flow rate of the first-system piping 61 causes the sudden change in magnitude that has not been observed in the learning period, the predicted value of the flow rate of the second-system piping 62 learned as having correlation causes the influenced erroneous change.

In other words, the predicted value (i.e., determination output data) of the flow rate of the second-system piping 62 is caused to differ from the actually measured flow rate (i.e., determination input data) after the mis-learning. Consequently, even though there is no abnormality in the actual flow rate of the second-system piping 22, it is erroneously determined to have an abnormality.

For this reason, the process amount P that causes the sudden change is assigned with the single-monitoring-signal determination flag F2 (FIG. 3), and is classified as the process amount P for which correlation is not learned.

When at least one process amount P causes the sudden change, the data classification function 12 (FIG. 3) of the present embodiment classifies this at least one process amount P into the decorrelation data. In this manner, the classification of each process amount P is performed on the basis of whether each process amount P causes the sudden change or not, and thus, the classification can be performed appropriately.

As described above, each process amount P is classified depending on one or more classification conditions. The learning input data can be generated in such a manner that each process amount P having a possibility of causing the influenced erroneous change due to the spurious correlation is classified as the single monitor signal and is separated from the physical correlation signal for learning correlation between process amounts. Such a learning manner can contribute to improvement in detection performance in the machine learning for generating a learning model, which handles the large number of sensors 3 and may induce erroneous detection due to the influential erroneous change.

Figure 14:
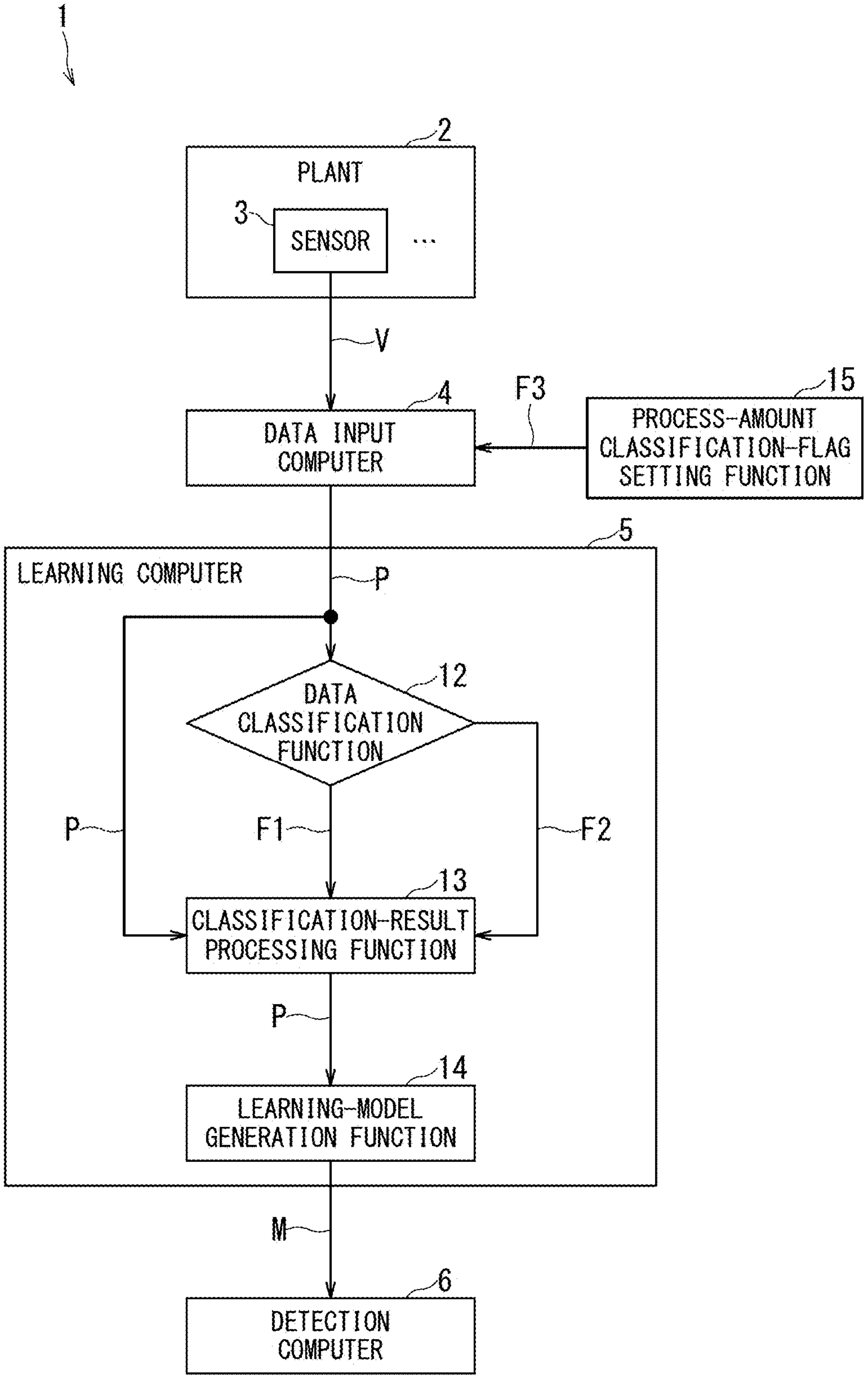
FIG. 14 is a functional block diagram illustrating a flow of processing to be executed by an abnormality sign detection system according to a modification.

Next, the abnormality sign detection system 1 according to a modification will be described by referring to FIG. 14. The same reference signs are assigned to the same components as those shown in the above-described embodiment, and duplicate description is omitted. The configuration applied in this modification may be applied to the above-described embodiment or may be used in combination with the above-described embodiment as appropriate.

In the above-described embodiment, the data classification function 12 of the learning computer 5 automatically classifies the process amounts P. In this modification, the process-amount classification flag F3 is outputted outside the learning computer 5 by adding the process-amount classification-flag setting function 15.

For example, the process-amount classification flag F3 is inputted to the data input computer 4 from the process-amount classification-flag setting function 15. This input processing of the process-amount classification flag F3 may be performed in response to the user's operation or may be automatically performed by the process-amount classification-flag setting function 15.

The data input computer 4 associates the process-amount classification flag F3 with the process amount P and outputs the process-amount classification flag F3. The data classification function 12 of the learning computer 5 sets the physical-correlation-signal determination flag F1 or the single-monitoring-signal determination flag F2 for the process amount P by reading the process-amount classification flag F3.

For example, as in the first classification condition described above, for the process amount P that should be classified as the process amount P regarding a device to be operated by the fixed value, conditions such as noise makes it difficult to distinguish the fixed value in the data in some cases. Even in such cases, on the basis of external information such as the design information, the process-amount classification flag F3 is set to each process amount P regarding the device to be operated by the fixed value, and thereby, each process amount P regarding the device to be operated by the fixed value is appropriately classified as the single monitoring signal.

In addition, as in the second classification condition described above, there are cases where the switching conditions cannot be completely covered or included for the change in correlation caused by switching of the operating conditions because of some reasons such as data missing and included abnormal data. Further, when obtained data are only the learning data, automatic classification becomes difficult. Even in such cases, on the basis of external information such as the design information, the process-amount classification flag F3 is set to each process amount P causing the erroneous influenced change due to switching of operating conditions, and thereby, each process amount P causing the erroneous influenced change due to switching of operating conditions is appropriately classified as the single monitoring signal.

As in the third classification condition described above, for each device that operates intermittently, the learning data are obtained only in the period during which intermittent operation is not performed, due to reasons such as missing data and included abnormal data in some cases. In such cases, though automatic classification of the process amounts P is difficult, on the basis of external information such as the design information, the process-amount classification flag F3 is set to each process amount P causing the influential erroneous change in the device operating intermittently, and thereby, each process amount P causing the influential erroneous change in the device operating intermittently is appropriately classified as the single monitoring signal.

As in the fourth classification condition described above, some process amounts P are affected by external factors. If the process amount P does not include a component that specifies the external factor to be eliminated (e.g., does not include the air pressure of the outside of the building 51 in FIG. 10), automatic classification becomes difficult. Even in such a case, on the basis of external information such as the design information, the process-amount classification flag F3 is set to each process amount P causing the influential erroneous change due to the external factor, and thereby, each process amount P causing the influential erroneous change due to the external factor is appropriately classified as the single monitoring signal.

As in the fifth classification condition described above, some process amounts P cause the sudden change. There are cases where it is difficult to determine whether the sudden change is change within a period shorter than the sampling period or not. For example, when a setting value temporarily increases or decreases due to conditions such as an interlock, this change of setting value is not classified as the sudden change in some cases. Even in such cases, on the basis of external information such as the design information, the process-amount classification flag F3 is set to each process amount P that causes the sudden change, and thereby, each process amount P that causes the sudden change is appropriately classified as the single monitoring signal.

In this manner, on the basis of external information such as the design information that is not included in each process amount P, each process amount P having a possibility of inducing the influenced erroneous change due to the spurious correlation can be classified as the single monitoring signal, and can be provided as the learning input data (i.e., input information) to be used for the machine learning.

The learning computer 5 according to the modification sets the process-amount classification flag F3 that classifies each process amount P into the correlation data or the decorrelation data, on the basis of external information. The external information includes: an information item that is not expected from the process amount P to be generated from the plant 2, as exemplified by the design information; and an information item that is not included in the process amount P to be generated from plant 2. In this manner, the classification of the process amounts P is performed on the basis of external information such as the design information, and thus, the classification can be performed appropriately.

The abnormality sign detection system 1 in the above-described embodiment includes a storage device such as a Read Only Memory (ROM) and a Random Access Memory (RAM), an external storage device such as a Hard Disk Drive (HDD) and a Solid State Drive (SSD), a display device such as a display panel, an input device such as a mouse and a keyboard, a communication interface, and a control device which has a highly integrated processor such as a Field Programmable Gate Array (FPGA), a Graphics Processing Unit (GPU), a Central Processing Unit (CPU), and a special-purpose chip. The abnormality sign detection system 1 can be achieved by hardware configuration with the use of a normal computer.

Note that each program executed in the abnormality sign detection system 1 of the above-described embodiment is provided by being incorporated in a memory such as the ROM in advance. Additionally or alternatively, each program may be provided by being stored as a file of installable or executable format in a non-transitory computer-readable storage medium such as a CD-ROM, a CD-R, a memory card, a DVD, and a flexible disk (FD).

In addition, each program executed in the abnormality sign detection system 1 may be stored on a computer connected to a network such as the Internet and be provided by being downloaded via a network. Further, the abnormality sign detection system 1 can also be configured by interconnecting and combining separate modules, which independently exhibit respective functions of components, via a network or a dedicated line.

According to the above-described embodiments, erroneous detection attributable to the spurious correlation can be suppressed by classifying each of the process amounts P into either: the correlation data for which correlation between the plurality of process amounts P is learned; or the decorrelation data for which correlation between the plurality of process amounts P is not learned.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. The articles “the”, “a” and “an” are not necessarily limited to mean only one, but rather are inclusive and open ended so as to include, optionally, multiple such elements.

What is claimed is:

1. An abnormality sign detection system comprising at least one computer configured to detect an abnormality or a sign of the abnormality in a target facility to be monitored with an abnormality sign detection model, wherein the at least one computer is configured to:

acquire a plurality of process amounts generated at the target facility, each process amount comprising a process value with a corresponding sensor identification;

classify the plurality of process amounts into a plurality of groups having no physical correlation therebetween, and according to a predetermined classification condition related to switching of an operating condition of the target facility, further classify the plurality of process amounts into either correlation data having a correlation among the plurality of process amounts in a same group or decorrelation data having no correlation among the plurality of process amounts in the same group;

generate learning input data using the plurality of process amounts associated with the correlation data or the decorrelation data;

perform machine learning by inputting the learning input data into the abnormality sign detection model to train the abnormality sign detection model; and determine the abnormality or the sign of the abnormality of the target facility based on a difference between input data and output data of the abnormality sign detection model.

2. The abnormality sign detection system according to claim 1, wherein the at least one computer is configured to set a process-amount classification flag that classifies each of for classifying the plurality of process amounts into either the correlation data or the decorrelation data according to the predetermined classification condition.

3. The abnormality sign detection system according to claim 1, wherein according to the predetermined classification condition when at least one process amount among the plurality of process amounts is operated at a fixed value, the at least one process amount is classified into the decorrelation data.

4. The abnormality sign detection system according to claim 1, wherein according to the predetermined classification condition at least one process amount among the plurality of process amounts is changed responsive to another process amount, the at least one process amount is classified into the decorrelation data.

5. The abnormality sign detection system according to claim 1, wherein according to the predetermined classification condition when at least one process amount among the plurality of process amounts changes due to an intermittent operation in part of the target facility, the at least one process amount is classified into the decorrelation data.

6. The abnormality sign detection system according to claim 1, wherein according to the predetermined classification condition when at least one process amount among the plurality of process amounts changes due to an external environment of the target facility, the at least one process amount is classified into the decorrelation data.

7. The abnormality sign detection system according to claim 1, wherein according to the predetermined classification condition when at least one process amount among the plurality of process amounts changes in a shorter period than a sampling period thereof, the at least one process amount is classified into the decorrelation data.

8. An abnormality sign detection method causing at least one computer, which is configured to detect an abnormality or a sign of the abnormality in a target facility to be monitored with an abnormality sign detection model, the abnormality sign detection method comprising:

acquiring a plurality of process amounts generated at the target facility, each process amount comprising a process value with a corresponding sensor identification;

classifying the plurality of process amounts into a plurality of groups having no physical correlation therebetween, and according to a predetermined classification condition related to switching of an operating condition of the target facility, further classifying the plurality of process amounts into either correlation data having a correlation among the plurality of process amounts in a same group or decorrelation data having no correlation among the plurality of process amounts in the same group;

generating learning input data using the plurality of process amounts associated with the correlation data or the decorrelation data;

performing machine learning by inputting the learning input data into the abnormality sign detection model to train the abnormality sign detection model; and determining the abnormality or the sign of the abnormality of the target facility based on a difference between input data and output data of the abnormality sign detection model.

* * * * *